(12) United States Patent
Yamada et al.

(10) Patent No.: US 6,820,711 B2
(45) Date of Patent: Nov. 23, 2004

(54) PARKING ASSISTING DEVICE

(75) Inventors: Satoshi Yamada, Aichi-ken (JP);
Kazunori Shimazaki, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/085,509

(22) Filed: Feb. 27, 2002

(65) Prior Publication Data

US 2003/0121706 A1 Jul. 3, 2003

(30) Foreign Application Priority Data

Mar. 7, 2001 (JP) ........................................ 2001-063338
Jun. 27, 2001 (JP) ........................................ 2001-194870

(51) Int. Cl.[7] .................................................. B60S 9/00
(52) U.S. Cl. .................... 180/204; 340/932.2; 340/438; 340/425.5; 701/36; 701/41
(58) Field of Search ................................ 180/271, 167, 180/169, 199, 204, 446; 701/36, 41, 1; 340/425.5, 438, 932.2

(56) References Cited

U.S. PATENT DOCUMENTS

| | | | | |
|---|---|---|---|---|
| 4,931,930 A | * | 6/1990 | Shyu et al. ..................... | 701/36 |
| 6,070,684 A |  | 6/2000 | Shimizu et al. ............. | 180/204 |
| 6,483,442 B2 | * | 11/2002 | Shimizu et al. .......... | 340/932.2 |
| 6,487,481 B2 | * | 11/2002 | Tanaka et al. ................. | 701/41 |
| 6,611,744 B1 | * | 8/2003 | Shimazaki et al. ............. | 701/41 |

| | | | | |
|---|---|---|---|---|
| 2002/0128750 A1 |  | 9/2002 | Kakinami et al. ............. | 701/1 |

FOREIGN PATENT DOCUMENTS

| | | | | |
|---|---|---|---|---|
| DE | 196 46 559 A1 | 5/1998 | ........... | B60Q/9/00 |
| DE | 198 09 416 A1 | 9/1999 | ........... | B60Q/9/00 |
| FR | 2 728 859 | 7/1996 | ........... | B62D/15/02 |
| FR | 2 806 998 | 10/2001 | ........... | B62D/1/18 |
| GB | 2 289 999 A | 12/1995 | ........... | G08G/1/16 |
| GB | 2 320 326 A | 6/1998 | ........... | G08G/1/16 |
| JP | 10-264840 | 10/1998 | ........... | B62D/6/00 |
| JP | 11-53933 | 2/1999 | ........... | F21V/33/00 |
| JP | 11-208370 | 8/1999 | ........... | B60Q/5/00 |
| JP | 11334470 A * | 12/1999 | ........... | B60R/1/00 |
| JP | 2000-289548 | 10/2000 | ........... | B60R/21/00 |
| JP | 2003002145 A * | 1/2003 | ........... | B60R/21/00 |
| WO | WO 01/12472 A1 | 2/2001 | ........... | B60R/21/00 |

* cited by examiner

*Primary Examiner*—Lesley D. Morris
*Assistant Examiner*—Daniel Yeagley
(74) *Attorney, Agent, or Firm*—Morgan &Finnegan, LLP

(57) ABSTRACT

A parking assisting device provides parking assisting information consisting of a first intermittent sound of a tone (A) indicating that a vehicle is approaching a target stop position, a continuous sound of a tone (B) indicating that a position of a vehicle coincides with a target stop position and a second intermittent sound of a tone (C) indicating that a vehicle has gone beyond a target stop position. An intermittent period of the first intermittent sound changes to be shorter as the vehicle approaches a target stop position closer and an intermittent period of the second intermittent sound changes to be longer as the vehicle goes beyond the target stop position farther.

18 Claims, 11 Drawing Sheets

FIG. 14A  STEP G1
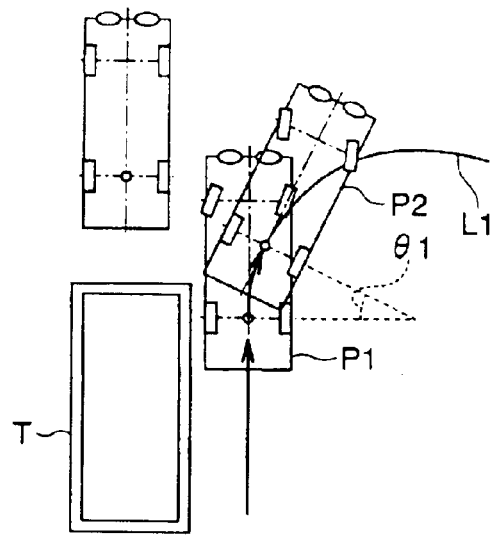
FIG. 14B  STEP G2
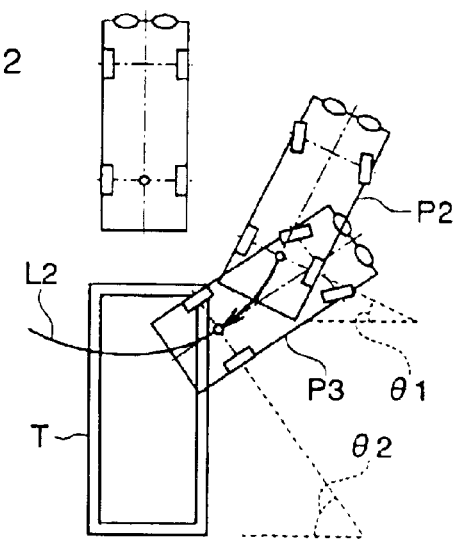
FIG. 14C  STEP G3
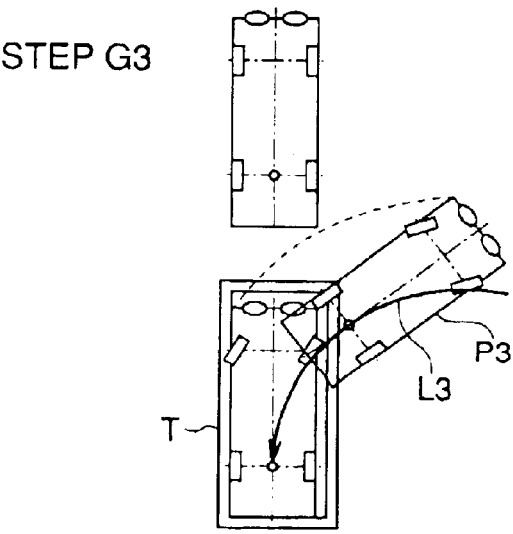

PARKING ASSISTING DEVICE

BACKGROUND OF THE INVENTION

1. Field of the Invention

The present invention relates to a parking assisting device.

2. Description of the Related Art

Conventionally, a method of guiding a vehicle to a target parking position according to each step shown in FIGS. 14A, 14B and 14C has been employed in a parking assisting device. That is, as step G1, the vehicle is moved forward passing the side of a target parking position T and stopped in a position P1 and is further moved forward with an appropriate turning track L1 to a position P2 where a turning angle is θ1. Then, as step G2, the vehicle in the position P2 is moved backward with an appropriate turning track L2 to a position P3 where a turning angle is θ2 and stopped. Lastly, as step G3, the vehicle in the position P3 is moved backward with a turning track L3 corresponding to a maximum steering angle to the target parking position T and the parking is completed. In this case, when the vehicle has reached the position P2 from the position P1 or reached the position P3 from the position P2, a driver is notified to that effect, respectively.

However, conventionally, since the driver is notified that the vehicle has reached the position P2 or the position P3 only when the position of the vehicle coincides with the position P2 or the position P3, the driver is informed to that effect abruptly in most cases. Therefore, in some cases, the driver may have difficulty in stopping the vehicle in a desired position based only on the information.

SUMMARY OF THE INVENTION

The present invention has been devised in view of the above and other drawbacks in the prior art, and it is an object of the present invention to provide a parking assisting device that is capable of easily stopping a vehicle in a desired position.

In order to attain the above-mentioned object, a parking assisting device in accordance with a first aspect of the present invention comprises: means for setting a reference of a turning position of a vehicle; means for detecting a turning position of a vehicle based on the reference; and means for notifying a driver of parking assisting information concerning a target guiding position based on the detected turning position of a vehicle, wherein the parking assisting information includes two kinds of information with forms different from each other provided in any two states, including a state in which the vehicle is behind the target guiding position, among three states consisting of a state in which the vehicle has reached the target guiding position and states in which the vehicle is in front of and behind the target guiding position, the two kinds of information informing the driver of at least two states among the three states.

The parking assisting device in accordance with a second aspect of the present invention comprises: means for setting a reference of a turning position of a vehicle; means for detecting a turning position of a vehicle based on the reference; and means for notifying a driver of parking assisting information concerning a target guiding position based on the detected turning position of a vehicle, wherein the parking assisting information includes a brake operation guiding sound, for guiding the driver at a start of a brake operation, that is provided in a first position before the vehicle reaches the target guiding position.

BRIEF DESCRIPTION OF THE DRAWINGS

In the accompanying drawings:

FIGS. 14A, 14B and 14C illustrate each step of parallel parking.

DETAILED DESCRIPTION OF THE PREFERRED EMBODIMENTS

Embodiments of the case in which a parking assisting device of the present invention is applied to parallel parking will be hereinafter described.

First Embodiment

Figure 1:
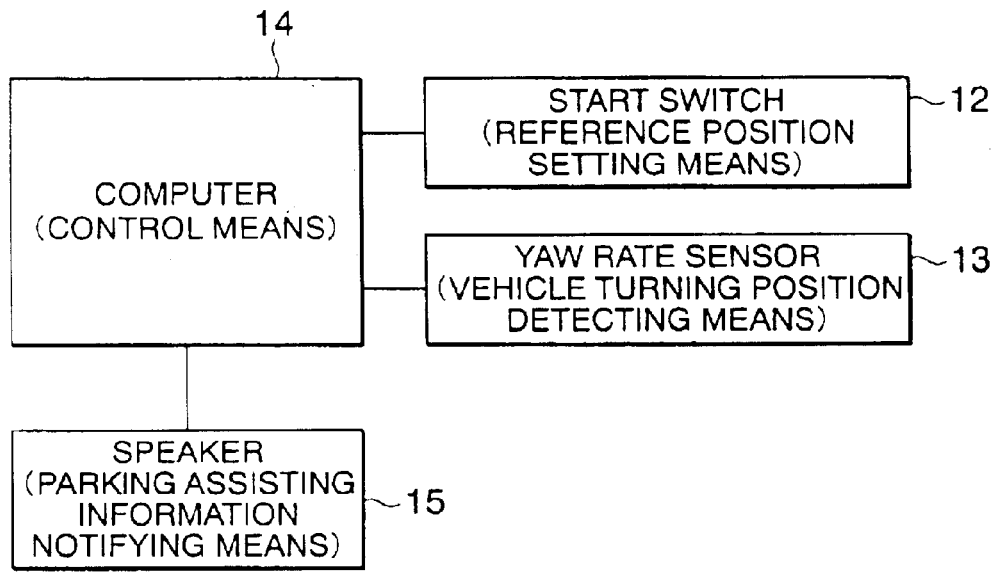
FIG. 1 is a block diagram showing a configuration of a parking assisting device in accordance with a first embodiment of the present invention.

As shown in FIG. 1, a parking assisting device 11 is provided with a start switch 12 as reference position setting means, a yaw rate sensor 13 as vehicle turning position detecting means, a computer 14 as control means to which the start switch 12 and the yaw rate sensor 13 are connected and a speaker 15 as parking assisting information notifying means connected to the computer 14. The start switch 12 is provided in a driving seat. When a driver actuates the start switch 12, information of the actuation is inputted in the computer 14. Then, the computer 14 recognizes that a position of a vehicle at that point is a reference position for calculating a vehicle turning position. The yaw rate sensor 13 detects an angular speed in the yaw direction of the vehicle. The computer 14 calculates how many degrees of turning angle from the reference position where the vehicle is currently located (vehicle turning position) from the actuation information of the start switch 12 and a detection result of the angular speed of the yaw rate sensor 13. Moreover, the computer 14 determines parking assistance information to be provided at that point from the calculated vehicle turning position. The speaker 15 outputs parking assisting information by sound to the driver based on such a determination of the computer 14.

Figure 2:
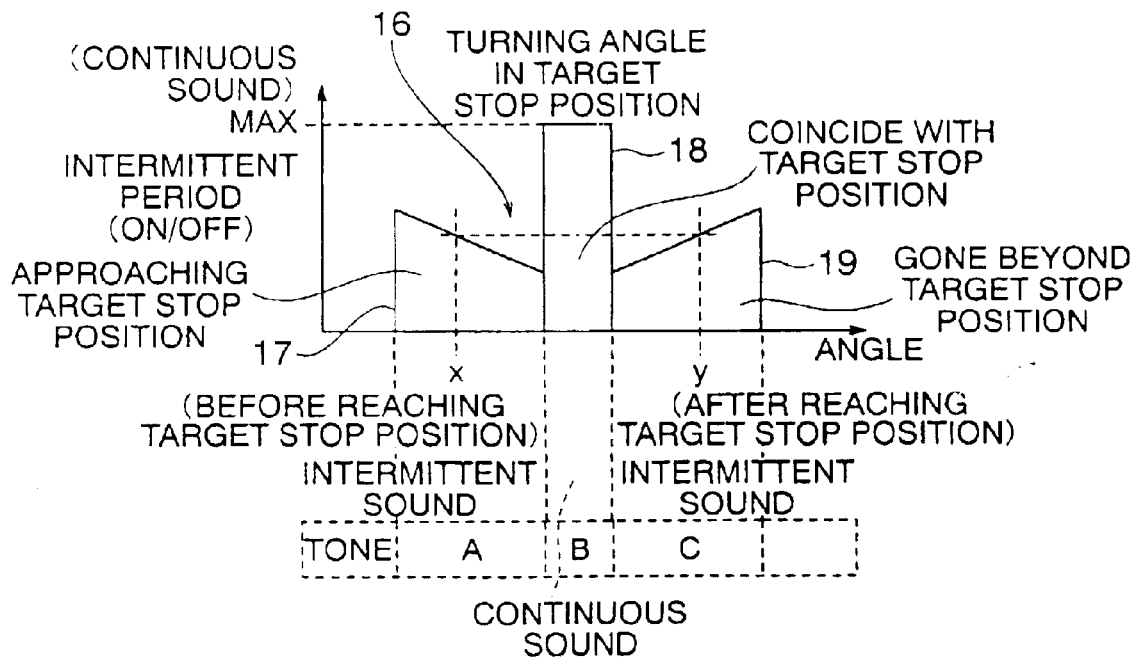
FIG. 2 illustrates parking assisting information provided by the parking assisting device in accordance with the first embodiment.

The parking assisting information by sound provided by the speaker 15 will be described with reference to FIG. 2. Parking assisting information 16 consists of a first intermittent sound (first information) 17 of a tone A indicating that a vehicle is approaching a target stop position, a continuous sound (third information) 18 of a tone B indicating that a position of the vehicle coincides with the target stop position and a second intermittent sound (second information) 19 of a tone C indicating that the vehicle has gone beyond the target stop position. The tones A, B and C are different from each other. In addition, the continuous sound 18 is provided when a turning angle of a vehicle becomes equal to a turning angle of a target stop position (target guiding position) within a tolerance.

Next, operations of the parking assisting device of this embodiment will be described. In this embodiment, a form in which all turning tracks L1, L2 and L3 are turning tracks by a maximum steering angle in FIG. 14 described above is employed. Therefore, a driver first moves forward passing the side of a target parking position T and stops a vehicle in a position P1 where the vehicle becomes substantially in parallel with the target parking position T. The driver actuates the start switch 12 there. As a consequence, the position P1 becomes a reference position for calculating a vehicle turning position, that is, a position where a turning angle is zero degree. The driver turns a steering wheel fully to the right from the position and starts turning and forward movement at a maximum steering angle. A change in a turning angle following the turning and forward movement of the vehicle is detected by the yaw rate sensor 13 and a turning position of the vehicle is defined based on the turning angle. The first intermittent sound 17 is outputted from the speaker 15 while the vehicle is approaching the next target stop position P2, that is, while the turning angle of the vehicle is smaller than θ1. At this point, an intermittent period (intermittent interval) of the first intermittent sound 17 changes to be shorter as the vehicle gets closer to the target stop position P2. For example, the intermittent period changes such that a time period of a silent state gets shorter in an intermittent sound in which two states alternatively appear in such a order of "beep, (silent state), beep, (silent state), and beep". Consequently, the driver can easily understand that the vehicle is currently in the state of approaching the target stop position P2 and, further, can easily recognize to which degree the vehicle has approached the target stop position P2 from the change in the intermittent period of the first intermittent sound 17. Then, at an instance when the turning angle becomes θ1 and a position of the vehicle coincides with the target stop position P2, the continuous sound 18 is outputted from the speaker 15. Consequently, the driver can recognize that the vehicle has reached the target stop position P2 and may stop the vehicle. In addition, if the driver further turned the vehicle or moved the vehicle forward unintentionally, the second intermittent sound 19 indicating that the vehicle has gone beyond the target stop position P2 is outputted from the speaker 15. Moreover, an intermittent period of the second intermittent sound 19 changes to be longer as the vehicle moves forward from the target stop position P2 farther. For example, the intermittent period changes such that a time period of a silent state gets longer in an intermittent sound in which two states alternatively appear in such a order of "buzz, (silent state), buzz, (silent state), and buzz". Further, it has been detected that the vehicle has passed the target stop position P2 from the fact that the turning angle of the vehicle around the reference position P1 has exceeded θ1. The driver can easily understand that the vehicle is currently in the state in which it has gone beyond the target stop position P2 from such an output of the second intermittent sound 19 and, further, can easily recognize to which extent the vehicle has gone beyond the target stop position P2 from the change in the intermittent period of the second intermittent sound 19. In addition, in a position x before the vehicle reaches the target stop position P2 and a position y after the vehicle has reached the target stop position P2, which are apart from the target stop position P2 by the same turning angle, since the turning angles are apart from the target stop position P2 by the same value, the intermittent periods of the first intermittent sound 17 and the second intermittent sound 19 are the same. However, in this embodiment, the tone of the second intermittent sound 19 is different from the tone of the first intermittent sound 17. Thus, even if the intermittent periods of the first intermittent sound 17 and the second intermittent sound 19 are the same, the driver can distinguish whether the vehicle is approaching or has gone beyond the target position P2 from the difference of the tones. Thereafter, the parking assisting information 16 for informing the driver of the turning angle θ2 is outputted for the target stop position P3 as well, whereby the driver can sequentially clear predetermined steps easily. With such parking assisting information provided, since the driver can move the vehicle while recognizing a degree of approach to a stop position of the vehicle in advance, the driver can stop the vehicle in a desired position.

Further, the continuous sound of the tone B is not limited to the form of continuously sounding until the subsequent intermittent sound of the tone C is outputted but may be a form of stopping after sounding for a predetermined period of time (e.g., 2 to 3 seconds) (this is the same for embodiments to be described later). Moreover, the sound of the tone B is not limited to a continuous sound but may be a sound of other forms as long as a driver can distinguish it from the respective sounds of the tones A and C (this is the same for embodiments to be described later).

Second Embodiment

Figure 3:
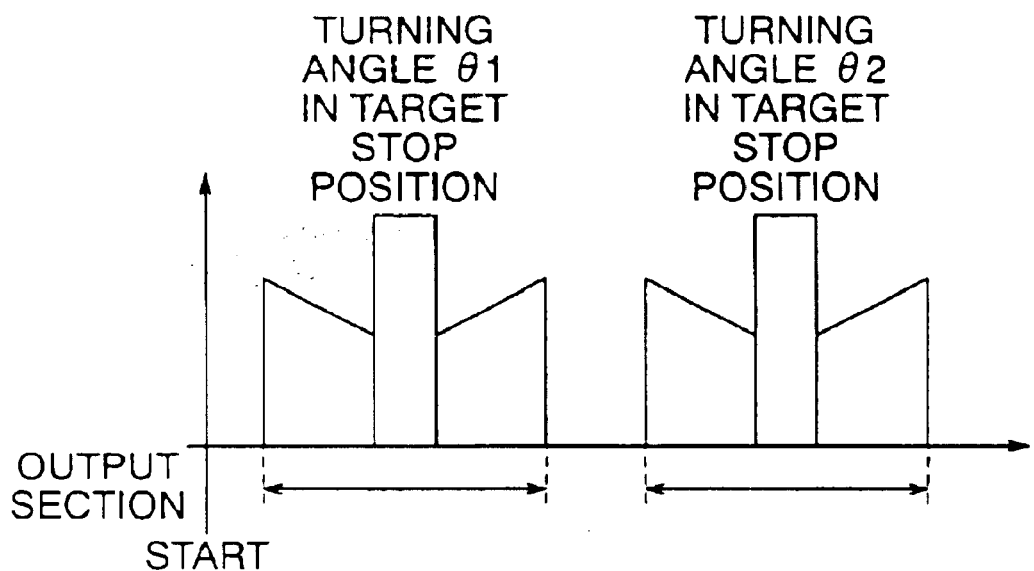
FIG. 3 illustrates a case in which parking assisting information is provided for each turning angle of a target guiding position.
Figure 4:
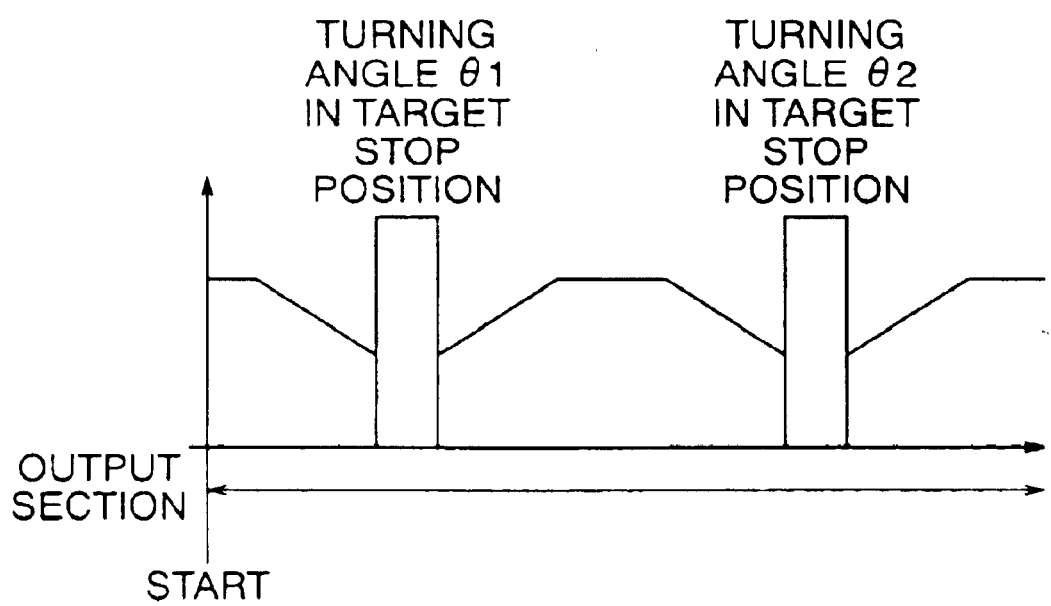
FIG. 4 illustrates a case in which parking assisting information is continuously outputted throughout a series of steps of parking.
Figure 5:
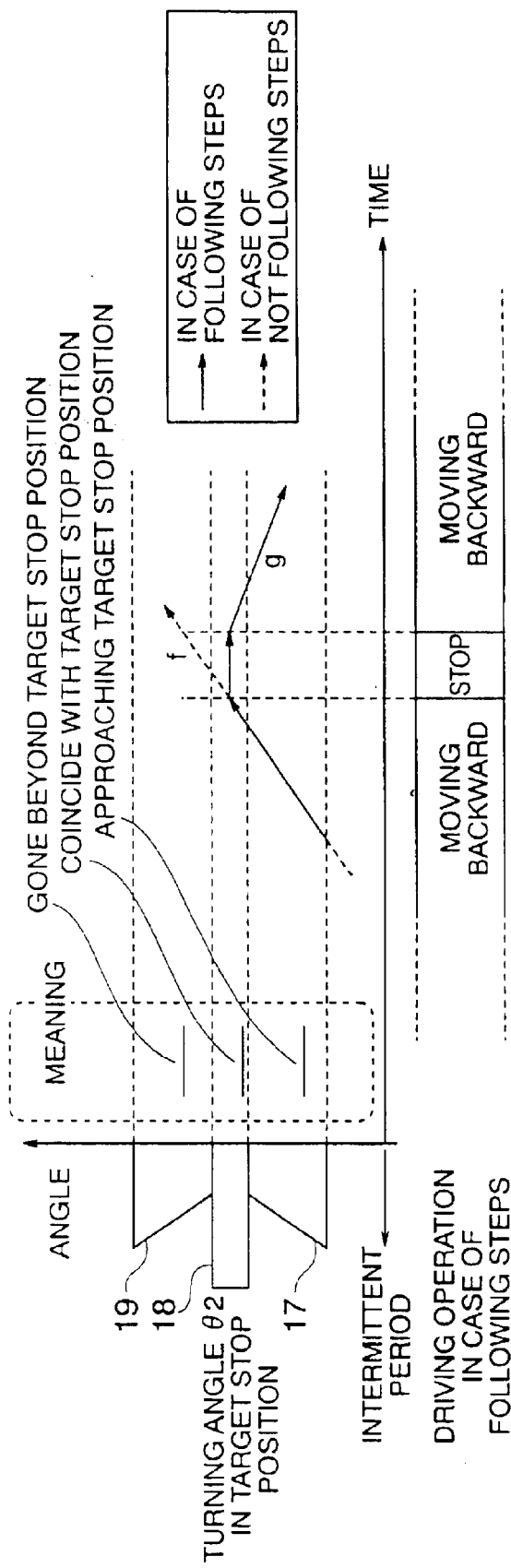
FIG. 5 illustrates parking assisting information in case of following the steps and in case of not following the steps in accordance with the parking assisting device of the first embodiment.

According to the above-mentioned first embodiment, the parking assisting information 16 is provided for each turning angle of a target stop position as shown in FIG. 3, whereby a driver can stop a vehicle in a desired position. If parking assisting information is continuously outputted throughout a series of steps of parallel parking as shown in FIG. 4, the following problems are likely to arise. According to meaning of each tone of the parking assisting information 16 of the first embodiment, if a vehicle moves without following desired steps, for example, if the vehicle has gone beyond a position P3 on the turning track L2, since the direction of the vehicle is slanted largely from the position P1, a turning angle around the reference position P1 becomes larger than θ2. Thus, in this case, as indicated by a symbol f in FIG. 5, it is determined that the vehicle has gone beyond the position P3 and the second intermittent sound 19 is provided. However, if a steering wheel is turned in the other direction and the vehicle has moved backward from the position P3 on the turning track L3 in accordance with the desired steps, since the slant of the vehicle is smaller than θ2, the first intermittent sound 17 is outputted as indicated by a symbol g in FIG. 5. Consequently, the driver hears the first intermittent sound 17 indicating that the vehicle is approaching the target stop position while recognizing that the vehicle is moving backward apart from the position P3. Thus, the driver is likely to have an illusion that the vehicle is still approaching the position P3 even if it has actually passed the position P3. In the second embodiment, the first embodiment is altered such that an unnatural state is not caused even if parking assisting information is continuously outputted.

Figure 6:
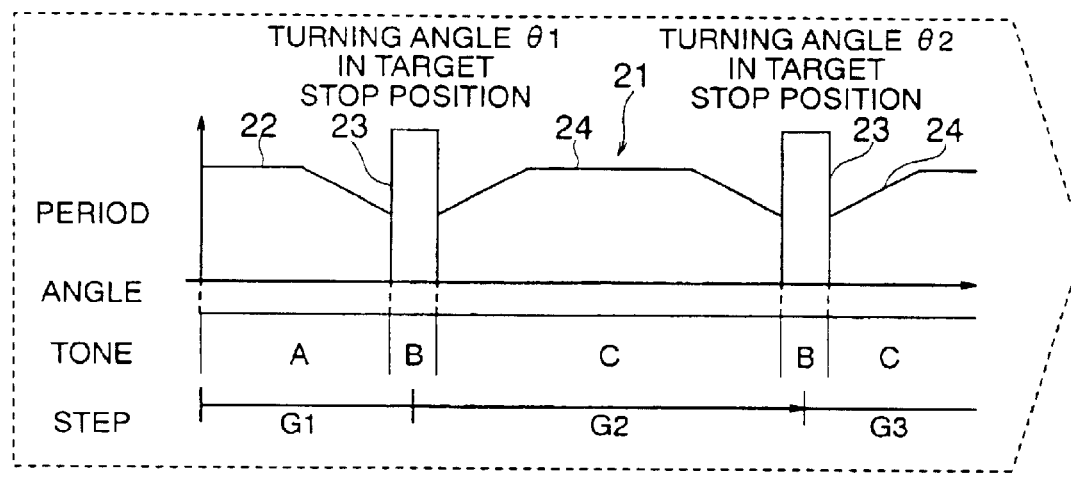
FIG. 6 illustrates parking assisting information provided by a parking assisting device in accordance with a second embodiment.

In the second embodiment, parking assisting information of sound 21 consists of a first intermittent sound (first information) 22 of a tone A indicating that a vehicle is required to move forward, a continuous sound (third information) 23 of a tone B indicating that a vehicle is required to stop and a second intermittent sound (second information) 24 of a tone C indicating that a vehicle is required to move backward as shown in FIG. 6. The tones A, B and C are different from each other. In addition, the continuous sound 23 is provided when a turning angle of a vehicle becomes equal to a turning angle in a target stop position within a tolerance.

Figure 7:
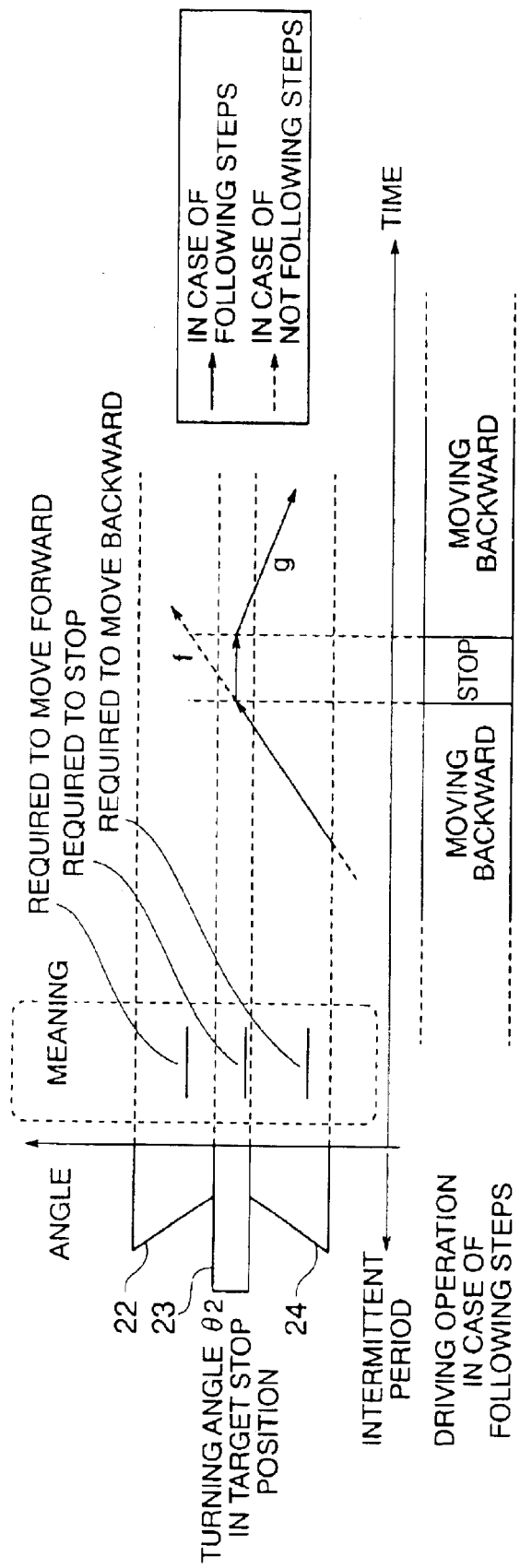
FIG. 7 illustrates parking assisting information in case of following steps and in case of not following the steps in accordance with the parking assisting device of the second embodiment.

Next, operations of the parking assisting device of the second embodiment will be described with reference to FIGS. 6 and 14. As in the first embodiment, a form in which all turning tracks L1, L2 and L3 are turning tracks by a maximum steering angle in FIG. 14 is employed in the second embodiment as well. A driver first moves a vehicle forward passing the side of the target parking position T and stops the vehicle in the position P1 where it becomes substantially in parallel with the target parking position T. The driver actuates the start switch 12 there. As a consequence, the position P1 becomes a position where a turning angle is zero degree. The first intermittent sound 22 of the tone A indicating that a vehicle is required to move forward is outputted while the driver is moving the vehicle from the position P1 to the position P2 as a step G1. When a turning angle becomes θ1, the continuous sound 23 of the tone B indicating that a vehicle is required to stop is outputted. If the vehicle could not stop at the turning angle θ1 and has gone beyond the position P2, that is, has moved forward excessively, since the turning angle becomes larger than θ1, the second intermittent sound 24 of the tone C indicating that a vehicle is required to move backward is outputted. Consequently, the driver recognizes that it is necessary to return to the position P2. On the other hand, while the driver stops the vehicle in the position P2 according to the desired steps and moves the vehicle to the position P3 as a step G2, the second intermittent sound 24 indicating that a vehicle is required to move backward is outputted. Here, although the second intermittent sound would indicate that the vehicle has gone beyond the position P3 within the meaning of the first embodiment, the second intermittent sound indicates that a vehicle is required to move backward in the second embodiment as described above. Thus, even if parking assisting information is outputted continuously up to the next target stop position, an actual behavior of the vehicle and meaning of information to be informed never become inconsistent. When the turning angle becomes θ2 and the vehicle reaches the position P3, the continuous sound 23 indicating that a vehicle is required to stop is outputted. Moreover, a case in which the vehicle has gone beyond the position P2 and a case in which the vehicle moves backward according to the desired steps will be described with reference to FIG. 7 corresponding to FIG. 5 of the first embodiment. First, if the vehicle has gone beyond the position P2, since the turning angle becomes larger than θ2, the first intermittent sound 22 is outputted as indicated by the symbol f in FIG. 7 and the driver recognizes that the vehicle is required to move forward. On the other hand, if the vehicle has moved backward from the position P3 according to the desired steps, since the turning angle becomes smaller than θ2, the second intermittent sound 24 is outputted. Thus, the driver can recognize that the vehicle is required to move backward and that the driver is driving according to the desired steps. In this way, since the driver can move the vehicle while recognizing a degree of approach of the vehicle to a stop position in advance, the driver can stop the vehicle in a desired position. In addition, even if parking assisting information is continuously outputted throughout a series of steps, an actual behavior of the vehicle and contents of information to be informed never become inconsistent. Further, there are advantages in continuously outputting parking assisting information as described below. If parking assisting information by sound is outputted for each target stop position, a driver is likely to have an illusion that guidance by a parking assisting device has ended when the sound stopped. However, if the sound is continuously outputted and stops when guidance ends, the driver can straightly recognize that guidance ends when the sound stops and the above-mentioned illusion can be prevented. Further, as shown in FIGS. 6 and 7, an intermittent interval of the respective intermittent sounds 22 and 24 changes as the vehicle approaches or moves away from a corresponding target stop position in the same manner as in the first embodiment.

Third Embodiment

Figure 8:
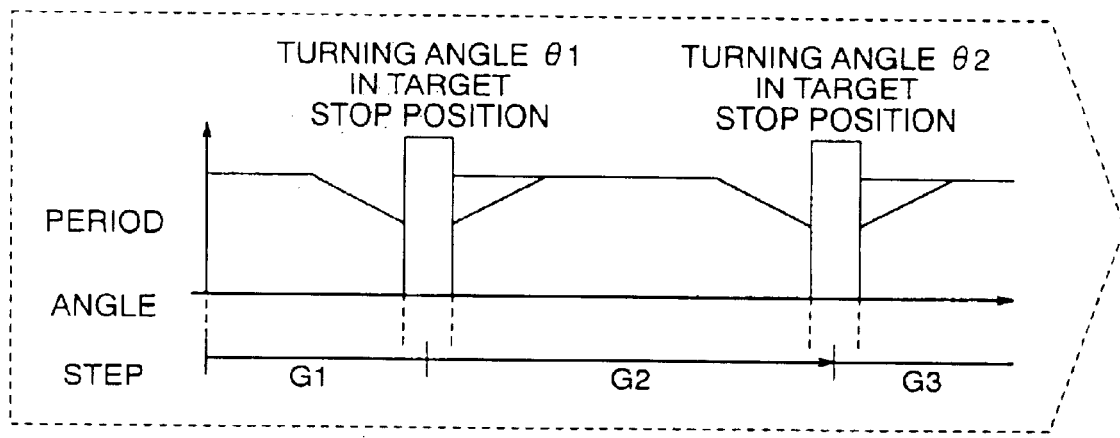
FIG. 8 illustrates parking assisting information in the case in which a period is variable or fixed in accordance with a parking assisting device of a third embodiment.

Next, parking assisting device in accordance with a third embodiment will be described with reference to FIG. 8. In this embodiment, both variable and fixed periods of an intermittent sound are used. That is, an intermittent sound is outputted with a period made variable in one of processes, in which a vehicle approaches a target stop position (or in which a vehicle is required to move forward) and in which a vehicle has gone beyond a target stop position (or in which a vehicle is required to move backward), and with the period made fixed in the other process. A driver can recognize that a vehicle is approaching a target stop position (or is required to move forward) or has gone beyond a target stop position (or is required to move backward) by such a form as well. Moreover, in this case, the driver can recognize whether a vehicle is approaching a target stop position (or is required to move forward) or has gone beyond a target stop position (or is required to move backward) by distinguishing whether the period is variable or fixed even if tones of two intermittent sounds before and after a continuous sound are not made different (the intermittent sounds may be made different). Alternatively, the period of the intermittent sound may be made variable in one of the cases in which the vehicle is following desired steps and in which the vehicle is not following the desired steps and may be fixed in the other. In addition, the parking assisting information is not limited to using both variable and fixed periods of an intermittent sound but may make degrees of variableness different across a target stop position.

Fourth Embodiment

Figure 9:
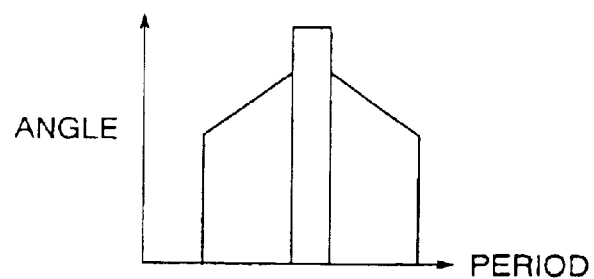
FIG. 9 illustrates parking assisting information provided by a parking assisting device in accordance with a fourth embodiment.

In the parking assisting information of the above-mentioned first to third embodiments, a form of a variable period of an intermittent sound is such that the closer a vehicle to a target stop position, the smaller the period becomes. In a fourth embodiment, a form of a variable period of an intermittent sound is set as shown in FIG. 9 in the parking assisting information of the first to the third embodiments. That is, the closer a vehicle to a target stop position, the larger the period of the intermittent sound becomes.

Fifth Embodiment

In the parking assisting information of the above-mentioned first to fourth embodiments, three states, in which a vehicle is approaching a target stop position (is required to move forward), a position of a vehicle coincides with a target stop position (a vehicle is required to stop) and a vehicle has gone beyond a target stop position (is required to move backward), are informed by three sounds consisting of one continuous sound and two intermittent sounds that are outputted before and after the continuous sound. As a fifth embodiment, the continuous sound indicating that a position of a vehicle coincides with a target stop position (a vehicle is required to stop) may not be outputted in the parking assisting information of the first to the fourth embodiments. That is, the parking assisting information of the present invention is not limited to the above-mentioned embodiments as long as three states consisting of a state in which a vehicle has reached a target stop position and states of positions in front of and behind the target stop position are indicated by two sounds with forms different from each other.

Sixth Embodiment

Figure 10A:
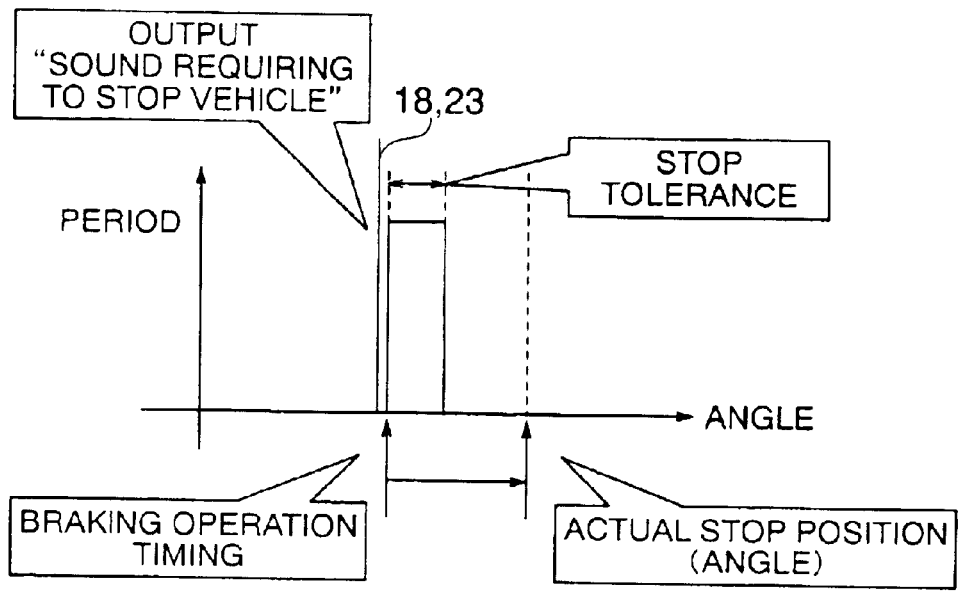
FIGS. 10A and 10B illustrate parking assisting information provided by a parking assisting device in accordance with a sixth embodiment.
Figure 10B:
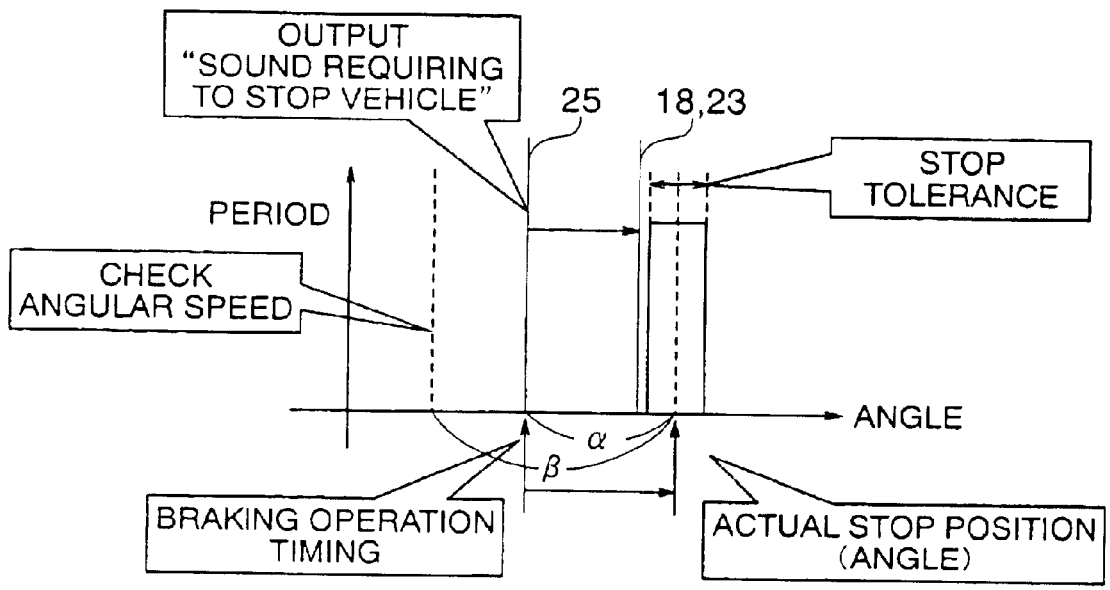

In a sixth embodiment, a brake operation guiding sound 25 for guiding braking operation is further outputted in the parking assisting information of the first to the fifth embodiments. As shown in FIG. 10A, even if a driver hears the continuous sounds 18 and 23 indicating that the position of the vehicle coincides with the target stop position (the vehicle is required to stop) and operates a brake, it is likely that a position where a vehicle actually stops is outside an initial stop tolerance. Thus, in this embodiment, sound requiring a vehicle to stop is outputted earlier as a brake operation guiding sound as shown in FIG. 10B to keep an actual stop position within the initial stop tolerance. Assuming that a turning angle indicating a target stop position is θ, the brake operation guiding sound 25 for guiding braking operation is outputted in a position before the turning angle θ by an angle α (first position). Further, a method of calculating the angle a is as follows. First, by the yaw rate sensor 13 a yaw direction angular speed of a vehicle in a predetermined position before the turning angle θ, which is known in advance as a position where a driver wishes to stop the vehicle, by an angle β (β>α) is detected. Then, if an angular speed at that point is assumed to be ω(β), the angle α is calculated as follows.

$$\omega(\beta) \times K = \alpha$$

That is, the higher the angular speed ω(β) of the turning angle β the larger the angle α, and the guiding sound 25 is outputted in a position farther before the target stop position. Further, K is a coefficient that is employed as an optimal value by an experiment. In addition, in order to avoid confusion for a driver due to increase of the number of sounds, the guiding sound 25 is the sound of the tone B that is the same as the continuous sounds 18 and 23 of the first to the fourth embodiments. In addition, in order to prevent the continuous sounds 18 and 23 from sounding again after the guiding sound 25 sounds once to confuse the driver, the guiding sound 25 is originally made to continuously sound until the timing when the continuous sounds 18 and 23 sound. In addition, an output range B0 of the sound of the tone B is defined as follows.

$$\theta - \alpha < B0 < \theta + FitR$$

Then, if the angular speed ω(β) is high, for example, when ω≧Ω(βmin), an angular speed detected by the yaw rate sensor 13 as the angular speed ω(β)=ω(β) is used as ω(β) without any change. Further, it is assumed that ω(βmin)= Fit/K. On the other hand, if the angular speed Ω(β) is low, for example, when ω(β)<ω(βmin), it is assumed that ω(β)= ω(βmin). In this way, by outputting the brake operation guiding sound 25 earlier than output timing of a continuous sound before a vehicle reaches a target stop position, it becomes possible for the driver to stop the vehicle within the initial stop tolerance more easily.

Seventh Embodiment

Figure 11:
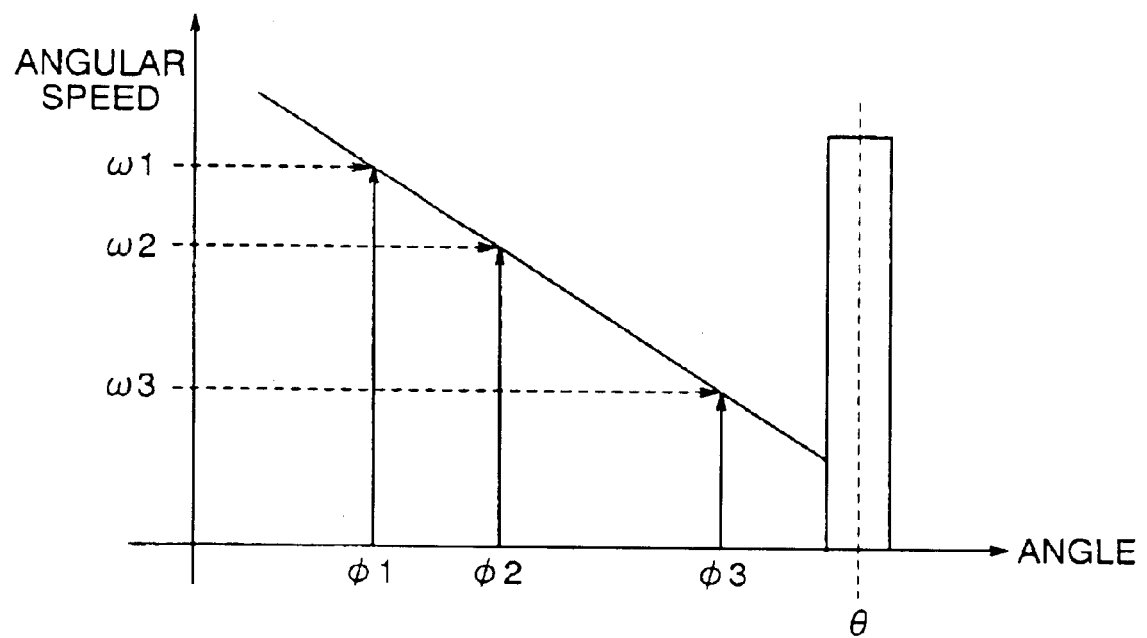
FIG. 11 illustrates an interrelation between a current turning angle of a vehicle and an angular speed for determining output timing of parking assisting information in accordance with a parking assisting device of a seventh embodiment.

In the sixth embodiment, in order to output the brake operation guiding sound 25 before the turning angle θ by the angle α, α is determined based on the angular speed ω(β) earlier than that. However, an angular speed of a vehicle may significantly change after checking the angular speed ω(β). That is, in a seventh embodiment, output timing of the brake operation guiding sound 25 is corrected depending on change in a vehicle speed in order to eliminate change in a stop position due to the vehicle speed. More specifically, as shown in FIG. 11, the output timing follows an interrelation between a current turning angle of a vehicle and an angular speed for determining an output. In the case in which it is assumed that the vehicle is currently in a position indicated by a turning angle Ø1 with respect to a target stop position indicated by the turning angle θ, if the current angular speed of the vehicle is ω1 as shown in FIG. 11, the brake operation guiding sound 25 is outputted at that point. If the angular speed of the vehicle at an turning angle Ø1 is less than ω1, the same check is continued thereafter to output the brake operation guiding sound 25 at an angular speed ω2 in a position of a turning angle Ø2 and at an angular speed ω3 in a position of a turning angle Ø3. In other words, a position where the brake operation guiding sound 25 is outputted is selected based on an interrelation between an angular speed of a vehicle at that point and a turning angle indicating a position of the vehicle. In this way, an angular speed of a current position (first position) is employed as an angular speed for determining a position (first position) where the brake operation guiding sound 25 is outputted, whereby appropriate timing in a current turning angle can be always calculated and the brake operation guiding sound 25 can be outputted at optimal timing even if a vehicle speed changes. Further, although an angular speed is used as a vehicle speed in the sixth and the seventh embodiments, the present invention is not limited to this but may be appropriately altered and implemented by, for example, using a speed on a turning track.

Eighth Embodiment

Figure 12:
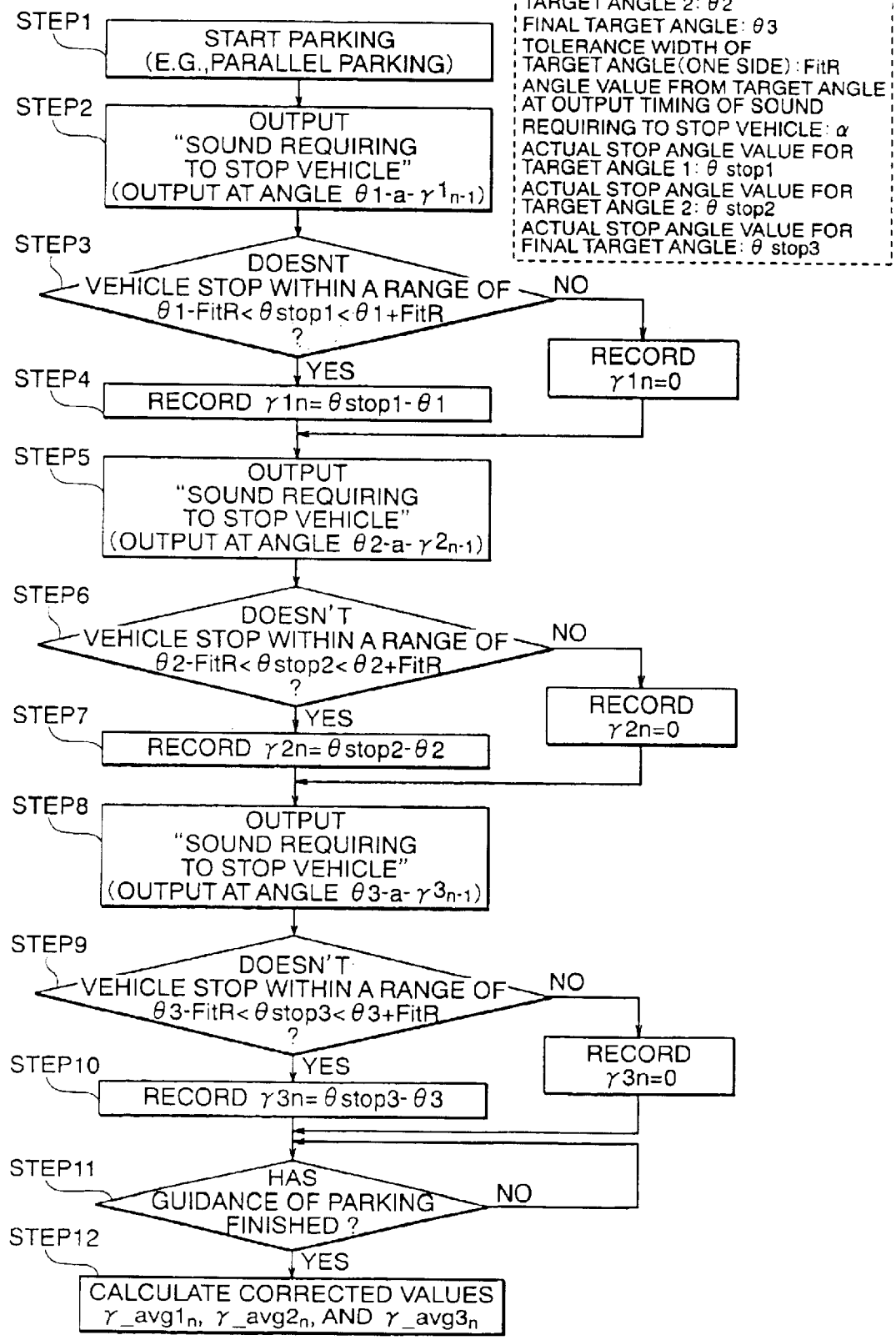
FIG. 12 is a flow chart showing a learning method for correcting output timing of parking assisting information in accordance with a parking assisting device of an eighth embodiment.

In the sixth embodiment, the brake operation guiding sound 25 is outputted before the turning angle θ by the angle α. However, a position where a vehicle actually stops after a driver hears the brake operation guiding sound 25 and starts a braking operation varies for each driver. That is, in an eighth embodiment, output timing of the brake operation guiding sound 25 is corrected by learning in order to eliminate variation of a stop position due to human factors. More specifically, a learning method as shown in FIG. 12 is used. This learning method will be described with a form of parallel parking shown in FIG. 14 as an example. Further, in FIG. 14, it is assumed that turning angles in the position P2, the position P3 and the target parking position T, that is, a target angle 1, a target angle 2 and a final target angle are θ1, θ2 and θ3 (θ3=0), respectively, and turning angles of positions where a vehicle actually stops in association with them, that is, actual stop angle values are θstop1, θstop2 and θstop3, respectively. Differences between the actual stop angle values and corresponding target angles upon guiding of parallel parking for the n-th time are assumed to be $\gamma1_n$, $\gamma2_n$ and $\gamma3_n$, respectively. Then, corrected values calculated when the guidance of parallel parking is completed are assumed to be $\gamma avg1_n$, $\gamma avg2_n$ and $\gamma avg3_n$, respectively.

As step 1 of FIG. 12, n-th parallel parking is started. As step 2, a sound requiring to stop a vehicle is outputted in a state in which the vehicle is close to the target angle θ1. Output timing of the sound requiring to stop a vehicle is the time when the turning angle of the vehicle is an angle $[\theta1-\alpha-\gamma1_{n-1}]$, in which $\gamma avg1_{n-1}$ that is a corrected value calculated in immediately preceding n−1-th guidance of parking is incorporated. Next, as step 3, it is determined whether or not the vehicle stops within a range where the actual stop angle value θstop1 is θ1−FitR<θstop1<θ1+FitR. If it is determined that the vehicle does not stop within the range, $\gamma1_n=\theta stop1-\theta1$ is calculated and stored as step 4. Further, if it is determined that the vehicle stops within the range, it is assumed that $\gamma1_n=0$. Thereafter, steps 5 to 7 are performed for the target angle θ2 and steps 8 to 10 are performed for the final target angle θ3 in the same manner as steps 2 to 4. Then, when the guidance of parking is completed by step 11, the corrected values $\gamma avg1_n$, $\gamma avg2_n$ and $\gamma avg3_n$ are calculated as moving averages, respectively, as step 12. In this way, in this embodiment, the sound requiring to stop a vehicle is outputted in a position of a turning angle of $\theta-\alpha\gamma_{n-1}$ that uses a corrected value by learning, whereby guiding information of a stop position can be provided to a driver such that variation of a stop position due to human factors is eliminated. Further, the above-mentioned moving average as a learning method is simply an example. There are other methods such as multiplying a calculated corrected value by L/M (optimal values are used as L and M by an experiment). Moreover, other learning methods may be used. In addition, it is also possible to perform the correction of output timing of the brake operation guiding sound 25 according to the eighth embodiment in combination with the correction of output timing of the brake operation guiding sound 25 according to the sixth and the seventh embodiments.

Ninth Embodiment

Figure 13A:
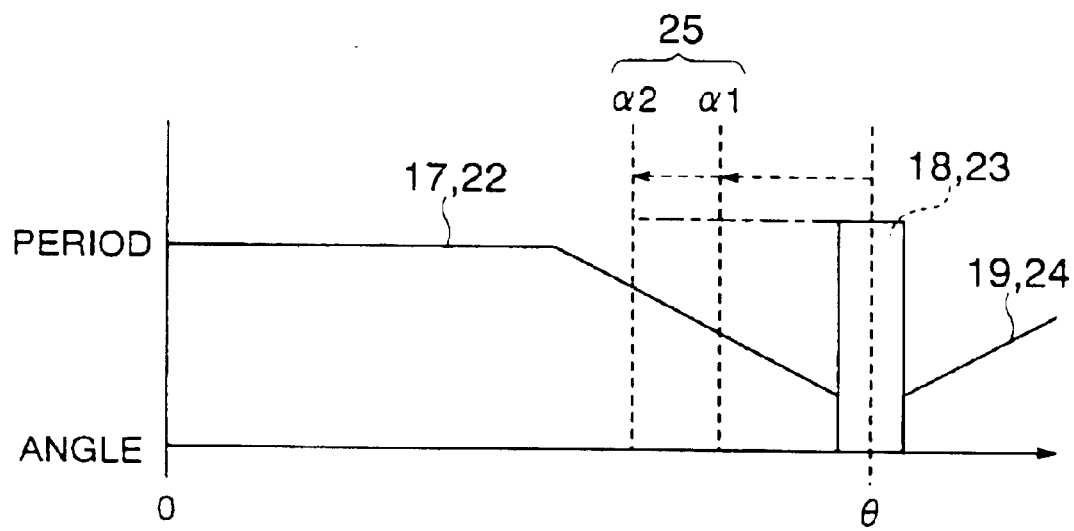
FIGS. 13A and 13B illustrate parking assisting information provided by a parking assisting device in accordance with a ninth embodiment.
Figure 13B:
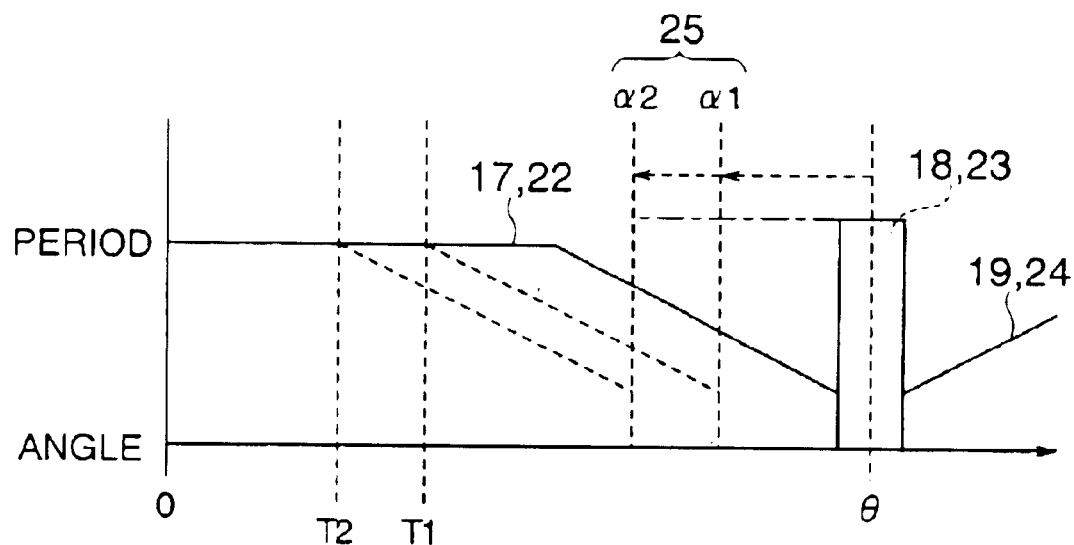

If the brake operation guiding sound 25 is outputted in the sixth to the eighth embodiments, the brake operation guiding sound 25 may be outputted such that it overlaps the first intermittent sounds 17 and 22 indicating that a vehicle is approaching and is required to move forward without altering a form of outputting the intermittent sounds 17 and 22 as shown in FIG. 13A. In addition, as shown in FIG. 13B, when the brake operation guiding sound 25 is outputted in a position before output positions of the continuous sounds 18 and 23, which indicate that the position of the vehicle coincides with the target stop position and the vehicle is required to stop, by angles α1 and α2, the first intermittent sounds 17 and 22 indicating that the vehicle is approaching and is required to move forward may also be outputted at timing for making the output earlier by the angles α1 and α2 accordingly such that the brake operation guiding sound 25 does not overlap the intermittent sounds 17 and 22.

Tenth Embodiment

As a tenth embodiment, intermittent sounds may not be outputted before and after the continuous sounds 18 and 23 and a target stop position may be informed only by a brake operation guiding sound in the above mentioned sixth to ninth embodiments.

Moreover, as another form, a sound different from the continuous sound of the tone B in the first to the fourth embodiments may be outputted as the brake operation guiding sound 25 and/or the continuous sounds 18 and 23 may sound again at an interval after the guiding sound 25 sounds in the above-mentioned sixth to ninth embodiments.

Eleventh Embodiment

In the above-mentioned first to tenth embodiments, a reference position is set by a driver inputting it, for example, by pressing a start switch. However, the present invention is not limited to this and a position may be automatically detected as a reference position by detecting a certain condition even if the driver does not set the reference position.

In addition, a yaw rate sensor is employed as a sensor for detecting a turning angle in the above-mentioned embodiments. However, the present invention is not limited to this and other means may be used (e.g., an angular speed may be detected by a speed sensor and a steering angle sensor). Moreover, a turning position is recognized as a turning angle. However, the present invention is not limited to this and it is possible to employ other forms of detecting and recognizing a turning position such as recognizing a turning position as a distance of a turning track or detecting a position itself (e.g., detection by the GPS) to process it as a turning position.

Twelfth Embodiment

In the above-mentioned embodiments, tones are selected as elements that are different from each other among specific elements of sound as parking assisting information and an intermittent period is selected as an element that indicates a form of change in an intermittent sound among specific elements of sound. However, the present invention is not limited to this. Thus, instead of the above-mentioned embodiments, it is also possible to appropriately select other elements among the specific elements of sound such as a tone, an intermittent period, a volume, a pitch, a sound pressure and a length of one sound to form parking assisting information. Further, as an example of difference of sound lengths, there are a long sound "beep, beep, beep" and a short sound "bip, bip, bip".

In addition, a sound may be a predetermined melody or a voice and a type of the melody or spoken words may be specific elements of sound.

Thirteenth Embodiment

In the above-mentioned embodiments, a sound is used as parking assisting information. However, the present invention is not limited to this and other auditory information or other information such as visual information and tactile information may be used. Alternatively, information in which these pieces of information are combined with each other simultaneously may be provided. Further, as an example of the visual information, there is light. In the case of light, as examples of specific elements of light, there are a color of light, a blinking period, a strength of light, an emitting time period of light and the like. In addition, a video, a figure, a sign or a character may be visual information. In addition, as an example of tactile information, there is vibration. In the case of vibration, as examples of specific elements of vibration, there are an interval of vibration, a strength of vibration, the number of times of vibration, a rhythm of vibration and the like.

Moreover, the above-mentioned embodiments concern parallel parking. However, the present invention is not limited to this and can be applied to other parking forms such as lateral parking.

Fourteenth Embodiment

In any of the above-mentioned first to thirteenth embodiments, parking assisting information indicates three states, which consist of a state in which a vehicle has reached a target stop position and states of positions in front of and behind the target stop position, by two kinds of information that have forms different from each other. However, the parking assisting information of the present invention is not limited to this but may be any information as long as it consists of two kinds of information with forms different from each other that are provided in any two states among three states, which consist of a state in which a vehicle has reached a target stop position and states of positions in front of and behind the target stop position, and informs a driver of at least two states among the three states. Thus, for example, the parking assisting information may be information of a first form and information of a second form that are provided in two states in which a vehicle is approaching a target stop position (is required to move forward) and in which a vehicle has gone beyond a target stop position (is required to move backward), respectively, and inform a driver of two states in which a vehicle is approaching a target stop position (is required to move forward) and in which a vehicle has gone beyond a target stop position (is required to move backward), two states in which a vehicle is approaching a target stop position (is required to move forward) and in which a position of a vehicle coincides with a target stop position (a vehicle is required to stop) or two states in which a position of a vehicle coincides with a target stop position (a vehicle is required to stop) and in which a vehicle has gone beyond a target stop position (is required to move backward). Moreover, as another example, the parking assisting information may be information that is provided in two states in which a vehicle is approaching a target stop position (is required to move forward) and in which a position of a vehicle coincides with a target stop position (a vehicle is required to stop), respectively, and informs a driver of two states in which a vehicle is approaching a target stop position (is required to move forward) and in which a vehicle has gone beyond a target stop position (is required to move backward), two states in which a vehicle is approaching a target stop position (is required to move forward) and in which a position of a vehicle coincides with a target stop position (a vehicle is required to stop) or two states in which a position of a vehicle coincides with a target stop position (a vehicle is required to stop) and in which a vehicle has gone beyond a target stop position (is required to move backward). Similarly, the parking assisting information may be information that is provided in two states in which a position of a vehicle coincides with a target stop position (a vehicle is required to stop) and in which a vehicle has gone beyond a target stop position (is required to move backward), respectively, and informs a driver of at least two states among the three states.

As described above, according to the parking assisting device in accordance with claim 1 of the present invention, the parking assisting information consists of two kinds of information with forms different from each other that are provided in any two states among three states consisting of a state in which a vehicle has reached a target guiding position and states in which a vehicle is in front of and behind the target guiding position. As a result, a driver can be informed by the parking assisting information of at least two states among the three states and can stop a vehicle at a desired position.

According to the parking assisting device in accordance with claim 2 of the present invention, first information and second information are provided in states in which the vehicle is in front of and behind the target guiding position, whereby a driver can be informed of three states consisting of a state in which a vehicle has reached a target stop position and states in which a vehicle is in front of and behind the target stop position and can stop a vehicle in a desired position.

According to the parking assisting device in accordance with claim 3 of the present invention, third information separately from first information and second information is obtained, whereby a driver can recognize more surely a state in which a vehicle has reached a target guiding position.

According to the parking assisting device in accordance with claim 4 of the present invention, first information, second information and third information are obtained, whereby a driver can recognize which state a vehicle is in among the states in which the vehicle is approaching, has gone beyond and has reached a target guiding position.

According to the parking assisting device in accordance with claim 5 of the present invention, first information, second information and third information are obtained, whereby a driver can recognize in which state among forward movement required, backward movement required and stop required states a vehicle is.

According to the parking assisting device in accordance with claim 6 of the present invention, at least one of elements specifying sound is obtained, whereby a driver can recognize whether contents of parking assisting information is first or second information and change of at least another one of the elements is detected, whereby a driver can recognize in what kind of state a vehicle position is with respect to a target guiding position.

According to the parking assisting device in accordance with claims 7 and 11 of the present invention, the driver hears a brake operation guiding sound to start a braking operation in a first position before the vehicle reaches the target guiding position, whereby a driver can stop a vehicle in a target guiding position more accurately.

According to the parking assisting device in accordance with claims 8 and 12 of the present invention, a brake operation guiding sound can be outputted in an appropriate position according to a vehicle speed.

According to the parking assisting device in accordance with claims 9 and 13 of the present invention, since a brake operation guiding sound can be outputted according to a current vehicle speed, a brake operation guiding sound is outputted in an appropriate position even if a vehicle speed is changing significantly.

According to the parking assisting device in accordance with claims 10 and 14 of the present invention, a brake operation guiding sound can be outputted in an appropriate position that is adapted to a habit of each driver.

According to the parking assisting device in accordance with claims 15 and 16 of the present invention, parking assisting information can be provided using light.

According to the parking assisting device in accordance with claims 17 and 18 of the present invention, parking assisting information can be provided using vibration.

What is claimed is:

1. A parking assisting device comprising:

means for setting a reference of a turning position of a vehicle;

means for detecting a turning position of a vehicle based on the reference; and means for notifying a driver of parking assisting information concerning a target guiding position based on the detected turning position of a vehicle, wherein the parking assisting information comprises two kinds of information with forms different from each other provided in any two states, including a state in which the vehicle is behind the target guiding position, among three states consisting of a state in which the vehicle has reached the target guiding position and states in which the vehicle is in front of and behind the target guiding position, the two kinds of information informing the driver of at least two states among the three states.

2. A parking assisting device according to claim 1, wherein the parking assisting information comprises first information and second information provided in the states in which the vehicle is in front of and behind the target guiding position, the first information and the second information with forms different from each other informing the driver of three states consisting of the state in which the vehicle has reached the target guiding position and the states of positions in which the vehicle is in front of and behind the target guiding position.

3. A parking assisting device according to claim 2, wherein the parking assisting information includes third information to be notified in the state in which the vehicle has reached the target guiding position.

4. A parking assisting device according to claim 3, wherein the first information, second information and third information indicate that the vehicle is approaching, has gone beyond and has reached the target guiding position, respectively.

5. A parking assisting device according to claim 3, wherein the first information, second information and third information indicate that the vehicle is required to move forward, is required to move backward and is required to stop, respectively.

6. A parking assisting device according to claim 2, wherein the parking assisting information consists of sounds, and the first information and second information have elements specifying sound, at least one of the elements being different between the first and second information, at least another one of the elements changing based on a vehicle position with respect to the target guiding position.

7. A parking assisting device according to claim 1, wherein the parking assisting information includes a brake operation guiding sound provided in a first position before the vehicle reaches the target guiding position.

8. A parking assisting device according to claim 7, wherein the first position is selected based on an angular speed of the vehicle in a predetermined position before the vehicle reaches the target guiding position.

9. A parking assisting device according to claim 7, wherein the first position is selected based on interrelation between a turning position of the vehicle and an angular speed of the vehicle in the turning position.

10. A parking assisting device according to claim 7, wherein the first position is selected by learning based on past data.

11. A parking assisting device comprising:

means for setting a reference of a turning position of a vehicle;

means for detecting a turning position of a vehicle based on the reference; and means for notifying a driver of parking assisting information concerning a target guiding position based on the detected turning position of a vehicle, wherein the parking assisting information includes a brake operation guiding sound for guiding the driver at a start of a brake operation that is provided in a first position before the vehicle reaches the target guiding position.

12. A parking assisting device according to claim 11, wherein the first position is selected based on an angular speed of the vehicle in a predetermined position before the vehicle reaches the target guiding position.

13. A parking assisting device according to claim 11, wherein the first position is selected based on an interrelation between a turning position of the vehicle and an angular speed of the vehicle in the turning position.

14. A parking assisting device according to claim 11, wherein the first position is selected by learning based on past data.

15. A parking assisting device according to claim 6, wherein the parking assisting information is of light instead of sound.

16. A parking assisting device according to claim 11, wherein the parking assisting information is of light instead of sound.

17. A parking assisting device according to claim 6, wherein the parking assisting information is of vibration instead of sound.

18. A parking assisting device according to claim 11, wherein the parking assisting information is of vibration instead of sound.

* * * * *

UNITED STATES PATENT AND TRADEMARK OFFICE
CERTIFICATE OF CORRECTION

PATENT NO. : 6,820,711 B2
DATED : November 23, 2004
INVENTOR(S) : Yamada et al.

It is certified that error appears in the above-identified patent and that said Letters Patent is hereby corrected as shown below:

Column 8,
Line 6, please delete "$\omega \geq \Omega(\beta min)$," and insert therefore -- $\omega(\beta) \geq \omega(\beta min)$, --;
Line 9, please delete "angular speed $\Omega(\beta)$" and insert therefore -- angular speed $\omega(\beta)$ --;

Column 9,
Line 32, please delete "$\theta - \alpha \gamma_{n-1}$" and insert therefore -- $\theta - \alpha - \gamma_{n-1}$ --;

Column 10,
Line 1, please delete "above mentioned" and insert therefore -- above-mentioned --.

Signed and Sealed this

First Day of March, 2005

JON W. DUDAS
*Director of the United States Patent and Trademark Office*